United States Patent

Horski

[11] Patent Number: 5,898,988
[45] Date of Patent: May 4, 1999

[54] METHOD OF MAKING A BRUSHLESS MOTOR WITH INSIDE MOUNTED SINGLE BEARING

[75] Inventor: Marek Horski, London, Canada

[73] Assignee: Siemens Electric Ltd., Brampton, Canada

[21] Appl. No.: 08/811,482

[22] Filed: Mar. 5, 1997

Related U.S. Application Data

[62] Division of application No. 08/573,819, Dec. 18, 1995, Pat. No. 5,654,598.

[51] Int. Cl.⁶ ........................ H02K 15/06
[52] U.S. Cl. ........................ 29/596; 29/597
[58] Field of Search ............... 29/596, 597, 598, 29/605; 310/67 R, 42, 71, 90, 254

[56] References Cited

U.S. PATENT DOCUMENTS

| | | |
|---|---|---|
| 2,658,157 | 11/1953 | Brouwer . |
| 2,832,906 | 4/1958 | Koons . |
| 3,453,465 | 7/1969 | De Boer et al. . |
| 3,512,025 | 5/1970 | Quellet . |
| 3,767,949 | 10/1973 | Newill . |
| 3,988,024 | 10/1976 | Watanabe et al. . |
| 3,993,920 | 11/1976 | Sato . |
| 3,997,805 | 12/1976 | Dochterman . |
| 4,007,390 | 2/1977 | Muller et al. . |
| 4,109,170 | 8/1978 | Fujita et al. . |
| 4,220,879 | 9/1980 | Hoshimi et al. . |
| 4,242,608 | 12/1980 | Ishigaki et al. . |
| 4,319,152 | 3/1982 | van Gils . |
| 4,322,666 | 3/1982 | Muller . |
| 4,352,036 | 9/1982 | Kuwako . |
| 4,539,497 | 9/1985 | Boyer . |
| 4,686,400 | 8/1987 | Fujisaki et al. . |
| 4,701,651 | 10/1987 | Tanaka . |
| 4,733,115 | 3/1988 | Barone et al. . |
| 4,763,037 | 8/1988 | Hashimoto et al. . |
| 4,788,464 | 11/1988 | Nishikawa et al. . |
| 4,793,562 | 12/1988 | Hirmke et al. . |
| 4,814,653 | 3/1989 | Hasegawa et al. . |
| 4,839,551 | 6/1989 | Tomisawa . |
| 4,851,731 | 7/1989 | Saotome et al. . |
| 4,853,567 | 8/1989 | Muramatsu et al. . |
| 4,978,878 | 12/1990 | Dijken . |
| 4,980,590 | 12/1990 | Taniguchi et al. . |
| 4,987,333 | 1/1991 | Noguchi et al. . |
| 5,027,025 | 6/1991 | Saneshige et al. . |
| 5,036,235 | 7/1991 | Kleckner . |
| 5,097,170 | 3/1992 | Baines . |
| 5,124,604 | 6/1992 | Swartz . |
| 5,144,183 | 9/1992 | Farrenkopf . |
| 5,146,144 | 9/1992 | Lee . |
| 5,252,871 | 10/1993 | Inoue . |
| 5,349,259 | 9/1994 | Kaneko et al. . |
| 5,396,135 | 3/1995 | Iwazaki et al. . |

Primary Examiner—Carl E. Hall

[57] ABSTRACT

A direct current (DC) brushless motor for automotive and HVAC applications utilizes a single angular contact bearing assembly to rotatably couple an exterior rotor to an interior stator. The single angular contact bearing assembly can be a double horizontal row ball bearing, a four point contact bearing, and a crossed cylindrical roller bearing. The rotor is staked to the bearing assembly by a hub-shaft. A cooling fan is disposed on the top of the rotor to cool internal control circuitry within the motor. The stator includes a winding set connector which is slideably engaged within a cavity of a deep draw support member.

7 Claims, 3 Drawing Sheets

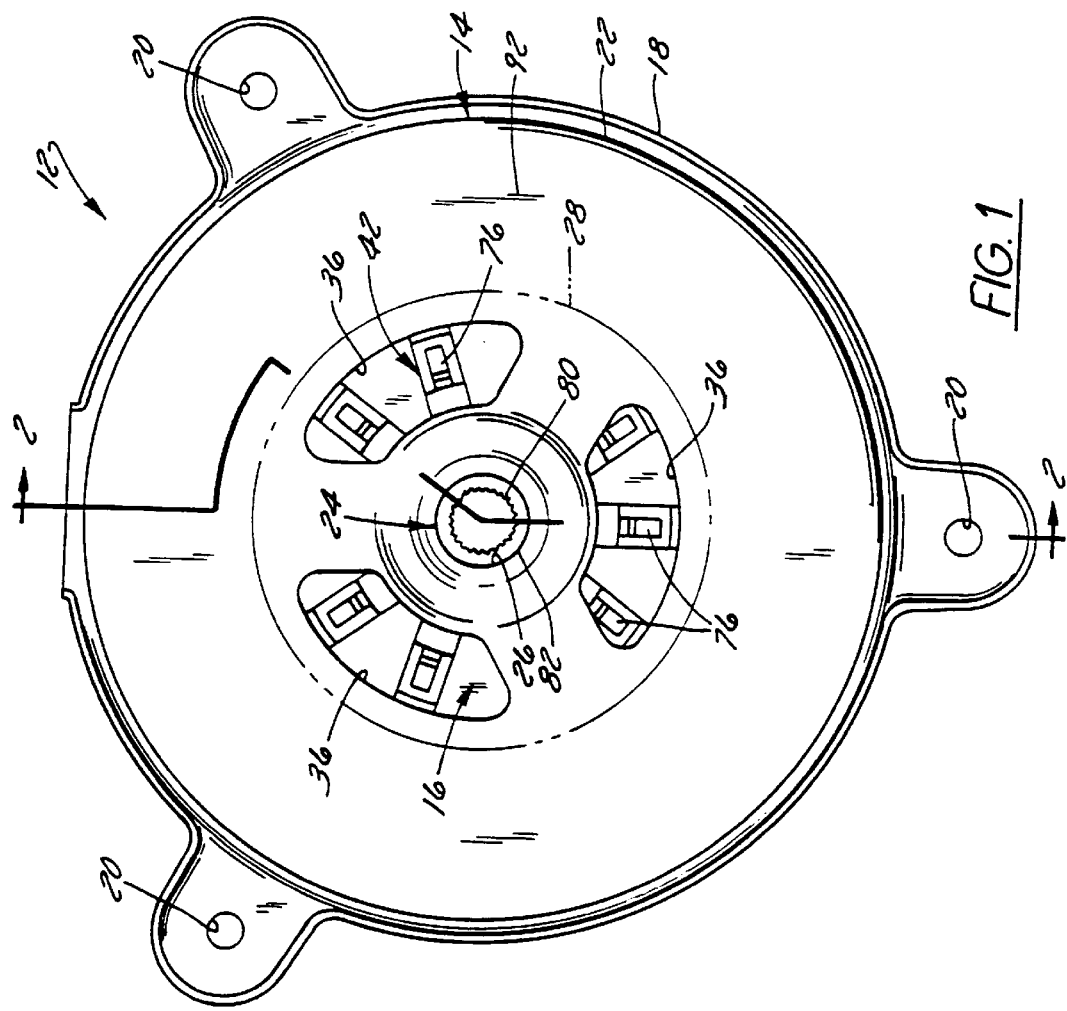
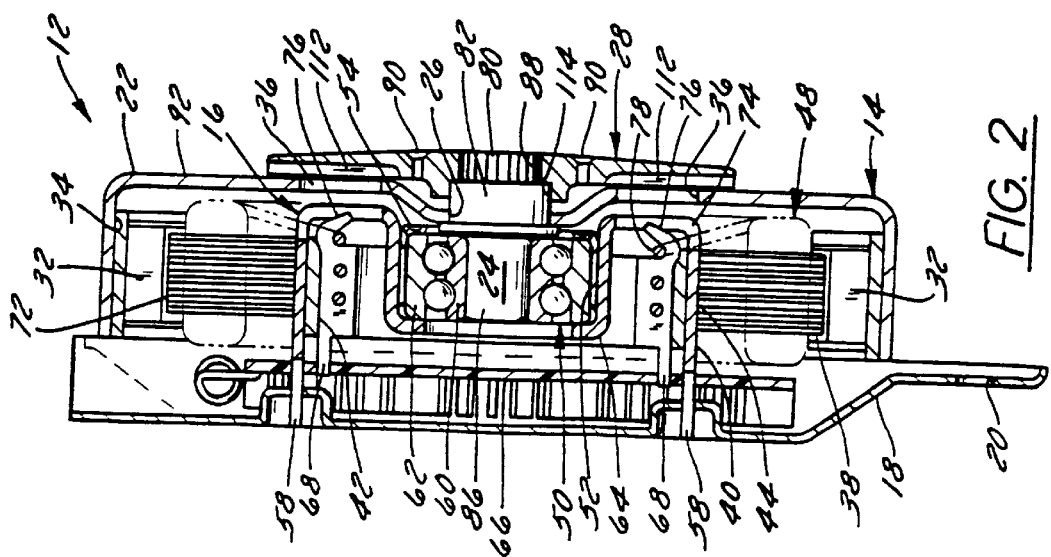

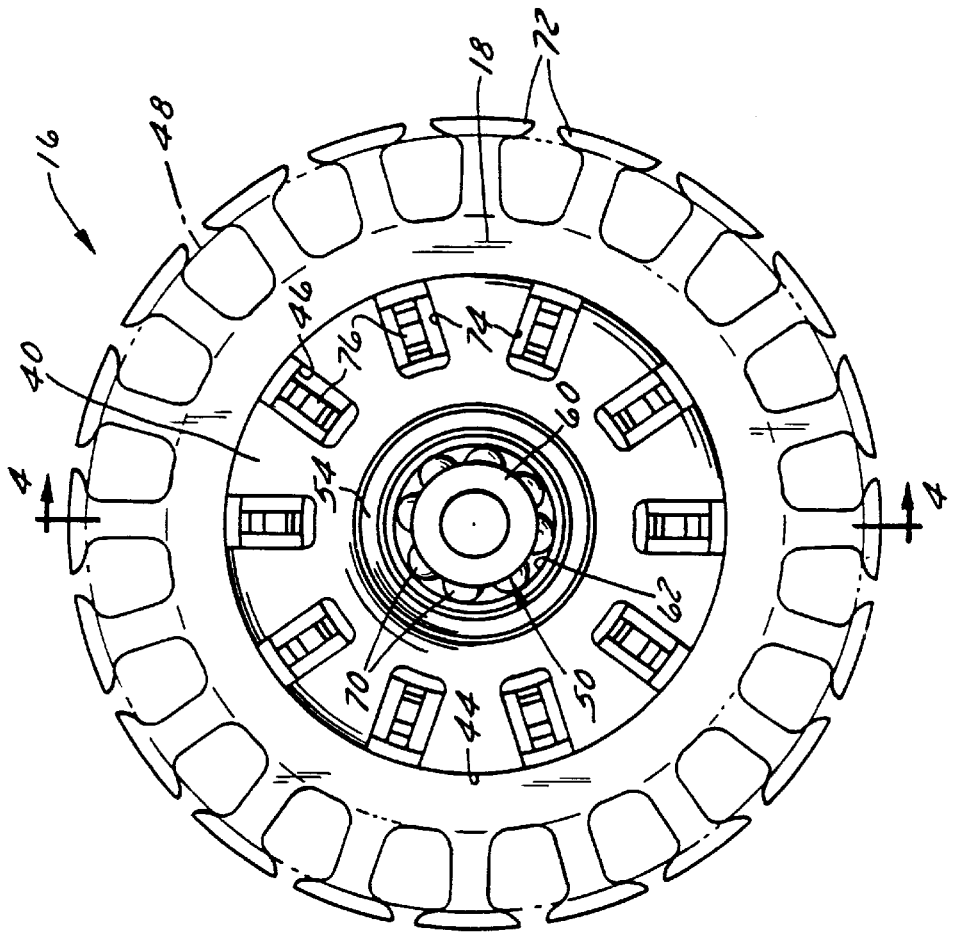

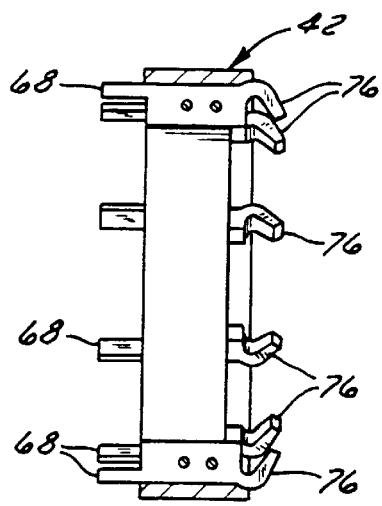
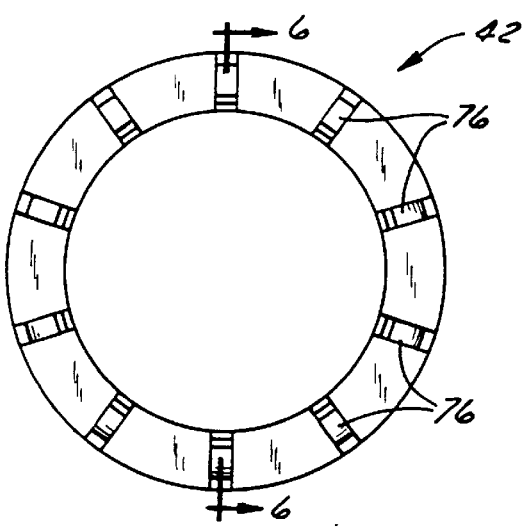
FIG. 6    FIG. 5
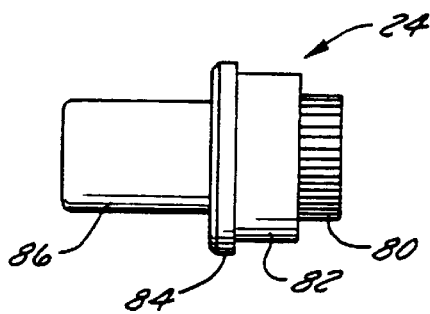
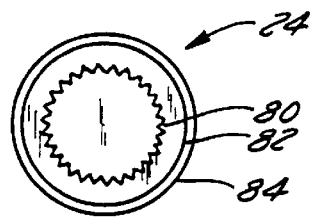
FIG. 8    FIG. 7
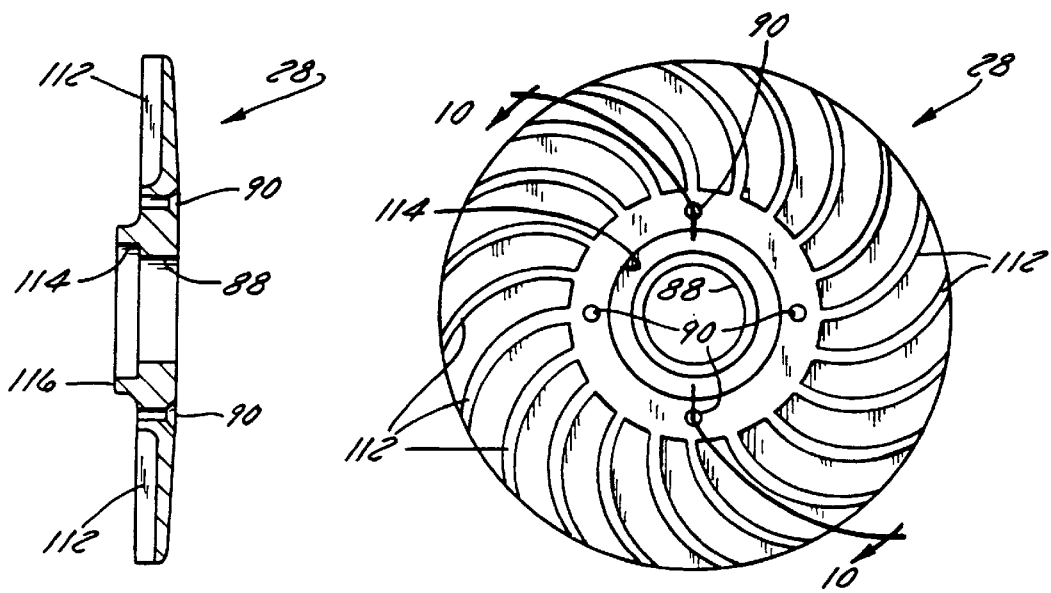
FIG. 10    FIG. 9

METHOD OF MAKING A BRUSHLESS MOTOR WITH INSIDE MOUNTED SINGLE BEARING

CROSS REFERENCE TO RELATED APPLICATIONS

This is a divisional, of application Ser. No. 08/573,819 filed Dec. 18,1995, now U.S. Pat. No. 5,654,598.

The present application is related to U.S. patent application Ser. No. 08/573,809 by Horski filed on Dec. 15, 1995 entitled "Slim-Line Brushless Motor" and U.S. patent application Ser. No. 05/574,007 by Horski filed on Dec. 15, 1995 entitled "Slim-Line Brushless Motor With Inside Mounted Single Bearing".

FIELD OF THE INVENTION

The present invention relates to a brushless motor for various applications including automotive and HVAC applications. More particularly, the present invention relates to a brushless motor having an outside rotor, an inside stator, and a single bearing assembly.

BACKGROUND OF THE INVENTION

Direct current (DC) brushless motors have been used in a variety of electronic and industrial applications such as automotive applications where the motor drives a fan to cool an automobile engine or HVAC applications where the motor drives a fan in a blower unit. Conventional brushless motors typically include a stator comprising a core having windings, a rotor having permanent magnets, and a shaft supporting the motor with respect to the stator. At least two ball bearing assemblies are generally employed to rotatably couple the shaft to either the stator or the rotor. The bearing assemblies are necessary to counteract the radial, axial and moment forces associated with the coupling of the rotor to the stator.

The use of at least two ball bearing assemblies adds to the cost and assembly time associated with conventional brushless motors. Two ball bearing assemblies require two sets of bearing retainers, two pieces of oil felt, additional lubricant, and a number of other components necessary to maintain the rotatable connection within the motor. Therefore, there is a need for a brushless motor which requires only a single bearing assembly to rotationally support the rotor with respect to the stator. Further, there is a need for brushless motor structure which can be easily assembled.

Conventional brushless motors often include electronic circuitry mounted within the motor. The electronic circuitry drives current through the windings of the stator to generate a magnetic field which effects rotation of the rotor. Such electronic circuitry generates heat which must be dissipated from the motor via large, expensive heat sinks. Thus, there is also a need for increased heat dissipation in conventional brushless motors.

SUMMARY OF THE INVENTION

The present invention relates to a brushless motor including an inside stator assembly including a support member, an outside rotor assembly, a single angular contact bearing, and a shaft. The outside rotor assembly is disposed about the inside stator assembly. The single angular contact bearing has an outside race and an inside race. The shaft is coupled to the rotor and fit into the inside race of the single angular contact bearing. The rotor assembly is rotatably coupled to the support member via the shaft and the single contact bearing.

The present invention also relates to a method of manufacturing a brushless motor including a stator assembly, a rotor assembly, an electronic control module, a shaft, and a bearing assembly. The stator assembly includes a plurality of ribs, a winding set connector, and a support member. The support member is slidably engaged with the winding set connector. The method includes steps of placing the winding set connector into an assembly position, winding a plurality of conductors about the hooks of the winding set connector and the ribs of the stator assembly, electrically connecting the hooks to the conductors, sliding the winding set connector to an operational position, electrically coupling the tabs of the winding set connector to the electronic control module, and rotatably coupling the rotor assembly to the stator assembly via the shaft and bearing assembly. The assembly position exposes the plurality of hooks on the winding set connector through apertures in the support member, and the hooks are electrically coupled to the plurality of tabs on the winding set connector.

The present invention also relates to a brushless motor for automotive applications. The brushless motor includes an exterior rotor, and an interior stator including a support member having a cavity, a bearing means for rotatably coupling the exterior rotor to the interior stator, and a hub-shaft. The hub-shaft is coupled to the rotor assembly and coupled to fit the bearing means. The exterior rotor is rotatably coupled to the support member and located about the interior stator.

In one exemplary aspect of the present invention, the brushless motor utilizes a single angular contact ball bearing assembly such as a double horizontal row contact ball bearing, four point contact ball bearing, or cross cylindrical ball bearing. The single angular contact ball bearing assembly effectively counteracts the axial, radial and moment forces associated with the motor. The use of such a ball bearing assembly provides a low cost, stable rotatable coupling between the rotor and stator which can be manufactured in a minimal amount of assembly time.

In another exemplary aspect of the present invention, the rotor is staked with a hub-shaft which is press fit into the single angular contact ball bearing assembly. The single angular contact ball bearing assembly is held within a cavity of a structural member which supports the stator. The mechanical orientation of the hub-shaft and bearing assembly with respect to the rotor and stator eliminates the need for additional shafts, bearings and bearing retainers. The hub-shaft preferably has a shaft section which is the same length or shorter than the height of the bearing assembly. Such a rotational connection between the rotor and stator reduces the assembly time of the brushless motor.

According to yet another exemplary aspect of the present invention, a cooling fan can be directly coupled to the rotor to provide air flow through cooling apertures in the rotor. The air flow advantageously cools control circuitry located within the motor. The fan also covers the cooling apertures of the rotor to protect the interior of the motor. A winding set connector is situated in the stator and allows the windings of the stator to be manufactured efficiently. The winding set connector is capable of a first position at which conductors may be wrapped around and fused to hooks of the winding set connector and a second position at which the motor is operated where the hooks are lowered beneath the rotor.

BRIEF DESCRIPTION OF THE DRAWINGS

The invention well hereinafter described with reference to the accompanying drawings wherein like numerals denote like elements and:

FIG. 1 is a front, end view of a motor in accordance with the first exemplary embodiment of a brushless motor shown without a cooling fan attached;

FIG. 2 is a cross-sectional view of the motor illustrated in FIG. 1 taken along line 2—2;

FIG. 3 is a more detailed front, end view of the stator assembly illustrated in FIGS. 1 and 2;

FIG. 4 is a cross-sectional view of the stator assembly illustrated in FIG. 3 taken along line 4—4 wherein a winding set connector of the stator assembly is in an assembly position;

FIG. 5 is a front, end view of the winding set connector illustrated in FIG. 4;

FIG. 6 is a cross-sectional view of the winding set connector illustrated in FIG. 5 taken along line 5—5;

FIG. 7 is a front, end view of the hub-shaft illustrated in FIGS. 1 and 2;

FIG. 8 is a side view of the hub-shaft illustrated in FIG. 7;

FIG. 9 is a rear, end view of the fan illustrated in FIG. 2; and

FIG. 10 is a cross-sectional view of the fan illustrated in FIG. 9 taken along line 10—10.

DETAILED DESCRIPTION OF THE PREFERRED EXEMPLARY EMBODIMENT OF THE PRESENT INVENTION

With reference to FIG. 1, a motor 12 includes an outer rotor assembly 14 positioned above and about an inner stator assembly 16 which is fixed to an end cup 18. End cup 18 includes mounting holes 20 which allow motor 12 to be secured to an automotive engine, hood compartment, blower unit, container or other apparatus. Rotor assembly 14 includes a bell-shaped rotor housing 22 aid is staked by a hub-shaft 24 through a mounting aperture 26 to stator assembly 16. Motor 12 is shown in FIG. 1 with a fan 28 (see FIG. 2) in dashed lines so the orientation of rotor assembly 14 with respect to stator assembly 16 can be observed more easily.

Rotor assembly 14 includes a permanent magnet or a number of permanent magnets 32 (FIG. 2) attached to an interior surface 34 of bell-shaped rotor housing 22. Rotor housing 22 includes cooling apertures 36 which expose stator assembly 16 (FIG. 1). Fan 28 (FIG. 2) is attached to hub-shaft 24 and mounted over cooling apertures 36 of rotor housing 22. Apertures 36 allow fan 28 to force air through rotor housing 22 to stator assembly 16. Additionally, fan 28 serves to cover apertures 36 to protect the interior of motor 12.

Stator assembly 16 includes a laminated stator core 38, a deep draw support member 40 and a winding set connector 42. Core 38 is coupled to an outside surface 44 of deep draw support member 40. Winding set connector 42 is slidably engaged within a cavity 46 of deep draw support member 40. A coil 48 is disposed in stator assembly 16 between core 38 and connector 42. A single angular contact bearing assembly 50 is held within a cavity 52 of deep draw support member 40 by a rim 54. Support member 40 is mechanically fixed to end cup 18 via tabs 58. Stator assembly 16 and the manufacture of coil 48 is discussed in more detail below with reference to FIGS. 3 and 4.

Hub-shaft 24 is preferably press fit into an inner annular ring or race 60 of bearing assembly 50. An outer annular ring or race 62 of bearing assembly 50 is enclosed within cavity 52 by rim 54 and a bottom surface 64 support member 40.

Hub-shaft 24 has a diameter sized with respect the diameter of inner race 60 so hub-shaft 24 is friction fit or press fit into bearing assembly 50. Hub-shaft 24 passes through aperture 26 of rotor assembly 14 and into bearing assembly 50 to rotatably couple rotor assembly 14 to stator assembly 16 with an easy to assembly connection. Alternatively, hub-shaft 24 can be integral with rotor assembly 14 or otherwise mechanically fixed to rotor housing 22 (e.g., welded). The geometry of hub-shaft 24 is discussed in more detail below with respect to FIGS. 7 and 8.

Winding set connector 42 is soldered or otherwise attached to a multi-chip module (MCM) control circuit 66 via tabs 68 located within motor 12. Control circuit 66 typically includes electronic devices, wiring, connectors and heat sinks, and is attached to end cup 18 via tabs 58. Control circuit 66 is disposed in-line with cooling apertures 36 so air flow from under the blades of an automotive fan (not shown, discussed below) can pass through control circuit 66 to fan 28. Control circuit 66 drives electric signals to or electrically commutates coil 482 via winding set connector 42.

Bearing assembly 50 preferably includes a double horizontal row of ball bearings 70 held between race 60 and race 62. Ball bearings 70 are biased in opposing directions to mitigate axial, radial and moment forces associated with the rotation of motor 12. The use of a lone angular contact bearing assembly 50 eliminates the need for separate and additional bearing assemblies (not shown). Such a configuration for rotatably coupling rotor assembly 14 to stator assembly 16 provides an advantageous structure for motor 12 which can be easily manufactured by avoiding problems such as alignment of more than a single bearing assembly.

With reference to FIGS. 3, 4, 5, and 6, stator assembly 16 includes ribs 72 disposed about surface 44 of deep draw support member 40. Deep draw support member 40 includes apertures 74 which expose hooks 76 of winding set connector 42. Apertures 74 advantageously allow air flow from cooling apertures 36 to reach control circuit 66.

Winding set connector 42 can be slid within cavity 46 of member 40 into a first position at which hooks 76 protrude through apertures 74 of member 40 (FIG. 4). In this position (e.g., the assembly position), coil 48 (FIGS. 2 and 4) can be assembled as conductors 78 (FIG. 4) are wrapped around ribs 72 and hooks 76. Conductors 78 can be wrapped in a variety of fashions to create coil 48 or several coils (not shown) in a variety of orientations or configurations.

After conductors 78 are wrapped, conductors 78 are soldered, fused, or electrically coupled to hooks 76 when winding set connector 42 is in the assembly position. After soldering conductors 78, winding set connector 42 can be slid into a second position (e.g., the operational position). In the operational position, hooks 76 of connector 42 are disposed beneath apertures 74, and tabs 68 of winding set connector 42 engage control circuit 66 (FIG. 2). Tabs 68 can be soldered to control circuit 66 to provide an electrical connection between control circuit 66 and connector 42 as well as secure circuit 66 to connector 42. Connector 42 provides a circuit path between tabs 68 and hooks 76.

With reference to FIGS. 2, 3, 4, 5 and 6, the advantageous orientation of winding set connector 42 within cavity 46 of support member 40 allow stator assembly 16 and coil 48 to be more efficiently manufactured. Conductors 78 can be easily wrapped around ribs 72 and hooks 76 when winding set connector 42 is in the assembly position. After conductors 78 are wrapped around hooks 76 and ribs 72, conductors 78 may be fused to hooks 76 by burning the insulation on conductors 78 to electrically couple hooks 76 to conductors 78. Winding set connector 42 is utilized to electrically couple the hooks 76 to tabs 68 which conveniently engage control circuit 66 when winding set connector 42 is slid into the operational position.

With reference to FIGS. 7 and 8, hub-shaft 24 includes a knurled section 80, a hub section 82, a bearing section 84, and a shaft section 86. Knurled section 80 interfaces for an interference fit with a mounting aperture 88 (FIGS. 9 and 10) of fan 28. Hub section 82 is sized for an interference fit with mounting aperture 26 of rotor assembly 14. Bearing section 84 prevents rotor assembly 14 from sliding in contact with bearing assembly 50. Shaft section 86 is preferably sized in accordance with the height of bearing assembly 50 and provides a friction fit with inner race 60. Shaft section 86 may be slightly longer than bearing assembly 50 and extend nearly to control circuit 66. Additionally, shaft section 86 may be shortened if the friction fit connection between race 60 and hub-shaft 24 is sufficiently rigid.

With reference to FIGS. 9 and 10, fan 28 is similar to a vacuum cleaner fan or other device and includes lowered portions or fins 112. Lowered fins 112 are curved and operate to pull air through apertures 36 and 74 from control circuit 66. Mounting aperture 88 of fan 28 is dimensioned for close conformal contact with knurled section 80 of hub-shaft 24. A recessed section 114 is dimensioned to sit over hub section 82 of hub-shaft 24. Fan 28 can operate to hold rotor assembly 14 between a bottom side 116 of fan 28 and bearing section 84 of hub-shaft 24. Additionally, fan 28 can include mounting holes 90.

An automotive fan located within an engine compartment of an automobile (not shown) for cooling the engine or heat exchange is driven by motor 12 and can be fixed to rotor assembly 14 above cooling fan 28. Alternatively, motor 12 can drive a blower fan in an HVAC system. Motor 12 is preferably a direct current (DC) brushless motor. The automotive fan or blower fan can be coupled directly to an outside surface 92 (FIGS. 1 and 2) of rotor assembly 14 via a clip, a screw, or other fastening device (not shown). Alternatively, the automotive fan or blower fan can be form fitted to outside surface 92 of rotor assembly 14 over cooling fan 28 (FIG. 2) of motor 12 or attached to motor 12 via belts, gears, or other mechanisms. The rotation of rotor assembly 14 turns the automotive fan or blower fan to provide air flow.

It is understood that, while the detailed drawings, specific examples, and particular components values given describe preferred exemplary embodiment of the present invention, therefore the purpose of illustration only. The apparatus and method of the invention is not limited to the precise details and conditions disclosed. For example, although the motor includes control circuitry mounted within it, other electrical connections could be utilized. Further, although particular shapes and aperture dimensions have been shown, various other shapes, geometries and dimensions could be utilized for the various components of the motor. Thus, the changes may be made to the details disclosed without parting from the spirit of the invention which is defined by the following claims.

What is claimed is:

1. A method of manufacturing a brushless motor including a stator assembly, a rotor assembly, an electronic control module, a shaft, and a bearing assembly, the stator assembly including a plurality of ribs, a winding set connector and a support member, the support member slidably engaged with the winding set connector, the method comprising steps of:

placing the winding set connector into an assembly position, the assembly position exposing a plurality of hooks on the winding set connector through a plurality of apertures in the support member;

winding a plurality of conductors about the hooks of the winding set connector and the ribs of the stator assembly, the hooks being electrically coupled to a plurality of tabs on the winding set connector;

electrically connecting the hooks to the conductors;

sliding the winding set connector within the support member to an operational position;

electrically coupling the tabs of the winding set connector to the electronic control module; and rotatably coupling the rotor assembly to the stator assembly via the shaft and bearing assembly.

2. The method of claim 1 wherein the step of rotatably coupling includes:

placing the bearing assembly into a cavity in the support member; and press fitting the shaft through the rotor and the bearing assembly.

3. The method of claim 2 wherein the bearing assembly is a single contact angular bearing assembly having a center annular ring.

4. The method of claim 3 wherein the cavity is centered with respect to the winding set connector.

5. The method of claim 3 wherein the bearing assembly is a four point contact bearing.

6. The method of claim 3 wherein the bearing assembly is a crossed cylindrical roller bearing.

7. The method of claim 1 wherein the electrical coupling step includes fusing the tabs to the electronic control module.

\* \* \* \* \*